(12) United States Patent
Wang et al.

(10) Patent No.: US 10,908,458 B2
(45) Date of Patent: Feb. 2, 2021

(54) BACKLIGHT MODULE AND DISPLAY DEVICE FOR ACHIEVING BRIGHTNESS UNIFORMITY

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Hui Wang, Beijing (CN); Xiaoming Meng, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 2 days.

(21) Appl. No.: 16/346,502

(22) PCT Filed: Jun. 22, 2018

(86) PCT No.: PCT/CN2018/092414
§ 371 (c)(1),
(2) Date: Apr. 30, 2019

(87) PCT Pub. No.: WO2019/041986
PCT Pub. Date: Mar. 7, 2019

(65) Prior Publication Data
US 2019/0294002 A1    Sep. 26, 2019

(30) Foreign Application Priority Data

Aug. 28, 2017 (CN) .......................... 2017 1 0750908

(51) Int. Cl.
*G02F 1/13357* (2006.01)
*F21V 8/00* (2006.01)
(Continued)

(52) U.S. Cl.
CPC ..... *G02F 1/133606* (2013.01); *G02B 6/0033* (2013.01); *G02F 1/1335* (2013.01); *G02F 1/1339* (2013.01); *G02F 1/133524* (2013.01)

(58) Field of Classification Search
CPC combination set(s) only.
See application file for complete search history.

(56) References Cited

U.S. PATENT DOCUMENTS

2006/0035077 A1* 2/2006 Husemann .................. C09J 7/35
428/354
2017/0363803 A1* 12/2017 Nakamori ......... G02F 1/133308
(Continued)

FOREIGN PATENT DOCUMENTS

CN     203349083 U     12/2013
CN     205643976 U     10/2016
(Continued)

OTHER PUBLICATIONS

International Search Report and Written Opinion for Application No. PCT/CN2018/092414, dated Aug. 28, 2017, 10 pages.

*Primary Examiner* — Lauren Nguyen
(74) *Attorney, Agent, or Firm* — Brooks Kushman P.C.

(57) ABSTRACT

A backlight module includes: a light guide plate, having a light incoming side and a light outgoing face; a rubber frame, arranged at four edges of the light guide plate; an optical film, arranged on the light outgoing face of the light guide plate and having four edges, where at least a portion of at least one edge among the four edges of the optical film exceeds an edge of the light guide plate and is placed on the rubber frame such that the rubber frame supports the optical film; and a spacer, where the spacer is located on the portion of the at least one edge of the optical film that is placed on the rubber frame and are located on a surface of the optical
(Continued)

film away from the rubber frame, and the spacer is used to support a display panel on the backlight module.

10 Claims, 2 Drawing Sheets

(51) Int. Cl.
*G02F 1/1339* (2006.01)
*G02F 1/1335* (2006.01)

(56) References Cited

U.S. PATENT DOCUMENTS

2018/0196310 A1 7/2018 Ma et al.
2018/0292703 A1 10/2018 Zhang

FOREIGN PATENT DOCUMENTS

| CN | 106773244 A | 5/2017 |
| JP | 2012242765 A | 12/2012 |
| KR | 20110028142 A | 3/2011 |

* cited by examiner

BACKLIGHT MODULE AND DISPLAY DEVICE FOR ACHIEVING BRIGHTNESS UNIFORMITY

CROSS-REFERENCE TO RELATED APPLICATIONS

This application is the U.S. national phase of PCT Application No. PCT/CN2018/092414 filed on Jun. 22, 2018, which claims priority to Chinese Patent Application No. 201710750908.8 filed on Aug. 28, 2017, which are incorporated herein by reference in their entireties.

TECHNICAL FIELD

The present disclosure relates to the field of display technology, in particular to a backlight module and a display device.

BACKGROUND

Liquid crystal display (LCD) is a kind of flat-panel display. Backlight module is a key component for LCD and serves as light source for LCD when the LCD works. As the rapid development of smart phones, backlight module with high brightness, narrow bezel and optimal image quality is required in the market. In the evolution of narrow-bezel LCD, the quality of backlight is decreased and particularly, a problem of bright line inside the backlight module is caused.

SUMMARY

The present disclosure provided a backlight module and a display device.

In a first aspect, the present disclosure provided a backlight module. The backlight module includes: a light guide plate, having a light incoming side and a light outgoing face; a rubber frame, arranged at four edges of the light guide plate; an optical film, arranged on the light outgoing face of the light guide plate and having four edges, where at least a portion of at least one edge among the four edges of the optical film exceeds an edge of the light guide plate and is placed on the rubber frame such that the rubber frame supports the optical film; and one or more spacers, where the one or more spacers are located on the portion of the at least one edge of the optical film that is placed on the rubber frame and are located on a surface of the optical film away from the rubber frame, and the one or more spacers are used to support a display panel on the backlight module.

Optionally, the one or more spacers are silicone spacers having a set transmittance.

Optionally, the four edges includes a first edge located at the light incoming side of the light guide plate and three edges in addition to the first edge, and in a direction perpendicular to the light outgoing face, the first edge of the optical film and an edge of the light incoming side of the light guide plate are located in a same plane. At least a portion of each of the three edges of the optical film exceeds an edge of the light guide plate and is placed on the rubber frame, and the one or more spacers are arranged at each of the three edges of the optical film.

Optionally, the rubber frame includes four edge frames and the four edge frames comprises a first edge frame located at the light incoming side of the light guide plate and three edge frames in addition to the first edge frame. First supporting faces are provided at two ends of each edge frame of the three edge frames of the rubber frame, the first supporting faces being protruding and used to support the display panel. A second supporting face is provided at a center of each of the three edge frames, the second supporting face being sunk and used to support the optical film. The at least the portion of each of the three edges of the optical film, exceeding the edge of the light guide plate, is placed on the second supporting face.

Optionally, at a center of each edge of the three edges of the optical film, the edge of the optical film, an edge of the one or more spacers and an outer edge of the rubber frame are located in a same plane in the direction perpendicular to the light outgoing face of the light guide plate. At two ends of each edge of the three edges of the optical film, the optical film extends out of the edge of the light guide plate and abuts against an inner edge of the rubber frame.

Optionally, the one or more spacers are spaced from each other by a same distance on a corresponding edge of the three edges.

Optionally, there is a set distance between the second supporting face and the first supporting face in the direction perpendicular to the light outgoing face of the light guide plate, and the set distance is larger than or equal to a sum of a thickness of the portion of the optical film that is placed on the second supporting face and a thickness of the one or more spacers.

Optionally, at least two spacers are provided at each edge of the three edges of the optical film.

Optionally, each of the three edges of the optical film exceeds a corresponding edge of the light guide plate by 0.5 mm or more than 0.5 mm.

In a second aspect, the present disclosure provides a display device. The display device includes: the backlight module in the first aspect, a display panel and a backboard. The backboard supports the backlight module and the display panel and surrounds an exterior of the backlight module and the display panel. At least one edge of four edges of the display panel is supported by the one or more spacers on the optical film.

Optionally, the display panel includes a first edge at the light incoming side of the light guide plate and three edges in addition to the first edge, the first edge of the display panel is supported by the rubber frame, and each of the three edges of the display panel is placed on the one or more spacers on a corresponding edge of the three edges of the optical film.

Optionally, the first edge of the display panel is placed on the first edge frame of the rubber frame and is supported by the first edge frame of the rubber frame, two ends of each edge of the three edges of the display panel are placed on the first supporting faces at the two ends of a corresponding edge frame of the rubber frame, and a center of each edge of the three edges of the display panel is placed on the one or more spacers on a corresponding edge of the three edges of the optical film, such that the two ends of each of the three edges of the display panel are supported by the first supporting faces and the center of each of the three edges of the display panel is supported by the one or more spacers.

DETAILED DESCRIPTION

To better clarify objectives, technical solutions and advantages of the present disclosure, the technical solutions of the present disclosure are described in a clear and complete way in conjunction with drawings in the present disclosure. Apparently, the described embodiments are only a part of rather than all of embodiments of the present application. All other embodiments obtained by those ordinary skilled in the art based on the described embodiments fall within the protection scope of the present disclosure.

In relevant technology, when a bezel of a display panel is too narrow, a distance between an optical film and a display region of a display panel is too small and light leakage may be caused. With the backlight module and the display device provided in the present disclosure, the light leakage of the backlight module caused when the bezel of the display panel is too small can be solved effectively.

Figure 1:
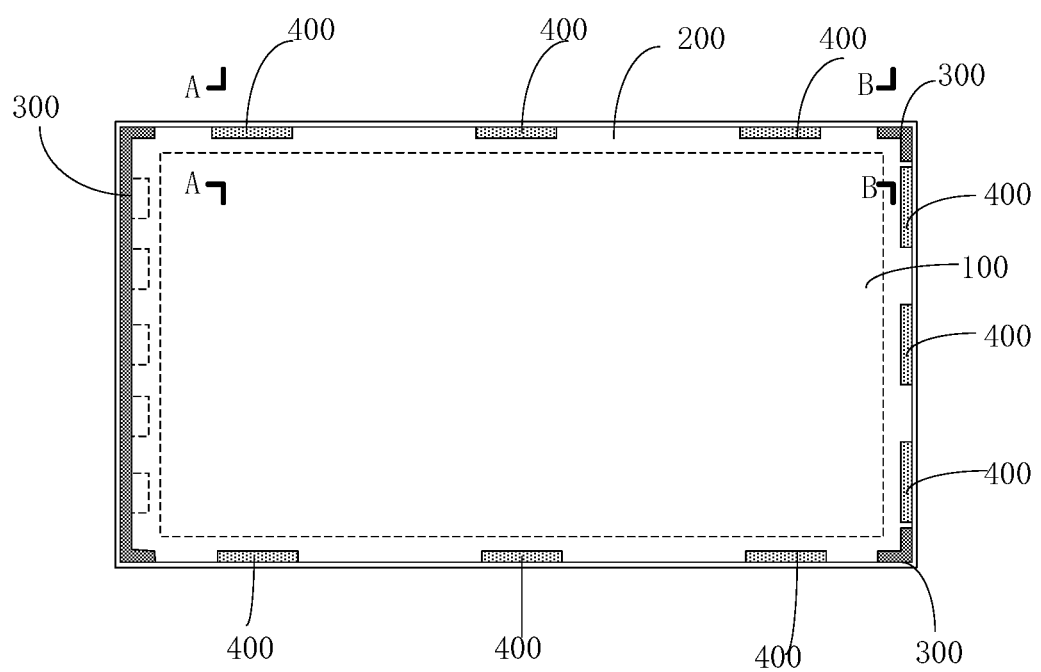
FIG. 1 is a main view of a display panel according to some embodiments of the present disclosure.
Figure 2:
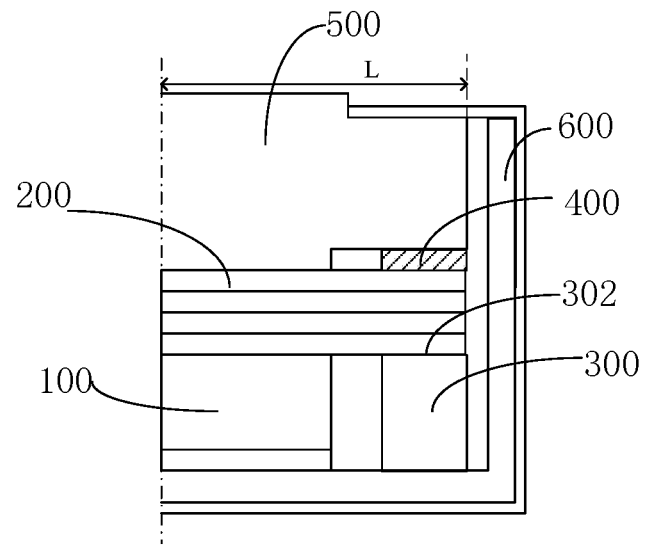
FIG. 2 is a sectional view of the display panel and a backlight module taken along line A-A in FIG. 1.

Reference can be made to FIG. 1 and FIG. 2. FIG. 1 is a main view of a display panel according to some embodiments of the present disclosure. FIG. 2 is a sectional view of the display panel and a backlight module taken along line A-A in FIG. 1. As shown in FIG. 1 and FIG. 2, the backlight module provided in the present disclosure includes: a light bar (not shown in FIG. 1 and FIG. 2), a light guide plate 100 having a light incoming side and a light outgoing face, a rubber frame 300 arranged at exteriors of four edges of the light guide plate 100, an optical film 200 arranged on the light outgoing face of the light guide plate 100, and one or more spacers 400. The optical film 200 includes four edges, at least a portion of at least one edge among the four edges exceeds an edge of the light guide plate and is placed on the rubber frame 300, such that the rubber frame 300 supports the optical film 200. The one or more spacers 400 are located on the portion of the at least one edge of the optical film 200 that is placed on the rubber frame 300 and are located on a surface of the optical film 200 away from the rubber frame 300. The one or more spacers 400 are used to support a display panel 500. The light bar is located at the light incoming side of the light guide plate 100. The light bar may be an LED light bar but it is not limited thereto.

In the backlight module and the display device provided in some embodiments of the present disclosure, at least a portion of at least one edge among the four edges of the optical film 200 is extended to exceed the edge of the light guide plate 100 and is placed on the rubber frame 300, the one or more spacers 400 are arranged on the portion of the optical film 200 that is placed on the rubber frame 300, such that the rubber frame 300 supports the optical film 200 and the one or more spacers 400 on the optical film 200 support the display panel 500. Compared with a manner that the rubber frame supports the display panel in relevant technology, since at least one edge of the optical film 200 extends out by a certain distance, a distance between the optical film 200 and a display region of the display panel 500 is increased, thereby effectively solving light leakage caused when the bezel of the display panel in the relevant technology is too small (for example, equal to or smaller than 2 mm).

In an optional embodiment of the present disclosure, the one or more spacers 400 are made of a silicone material having a transmittance. By using the silicone material, on one hand, the one or more spacers may not damage the display panel 500 while supporting the display panel 500; on the other hand, the transmittance and shape of the silicone may be adjusted according to needs, to adjust a brightness uniformity at an edge of the optical film 200.

Figure 3:
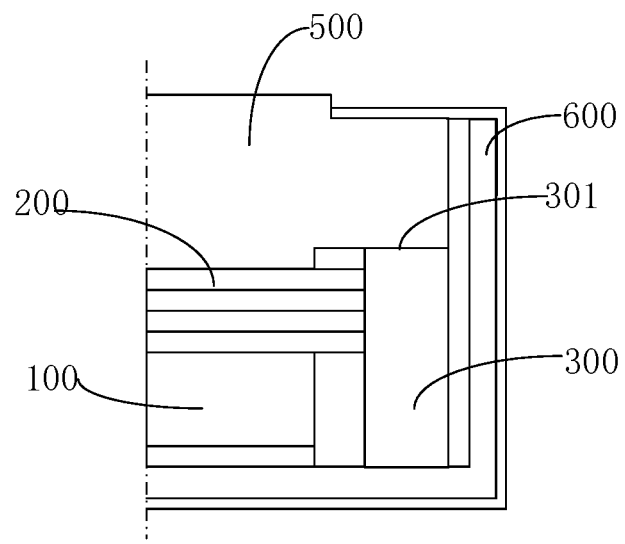
FIG. 3 is a sectional view of the display panel and a backlight module taken along line B-B in FIG. 1.

In addition, in an optional embodiment of the present disclosure, as shown in FIG. 1 to FIG. 3, the optical film 200 includes four edges. The four edges includes a first edge located at the light incoming side of the light guide plate 100 and three edges other than the first edge. In a direction perpendicular to the light outgoing face, the first edge of the optical film and an edge of the light incoming side of the light guide plate are located in a same plane. At least a portion of each of the three edges of the optical film 200 exceeds an edge of the light guide plate 100 and is placed on the rubber frame 300. A spacer 400 is arranged at each of the three edges of the optical film 200.

Optionally, at a center of each edge of the three edges of the optical film 200, the edge of the optical film 200, an edge of the spacer 400 and an outer edge of the rubber frame are located in a same plane in a direction perpendicular to the light outgoing face of the light guide plate 100. At two ends of each edge of the three edges of the optical film 200, the optical film extends out of the edge of the light guide plate 100 and abuts against an inner edge of the rubber frame 300.

In the above solution, at the light incoming side of the light guide plate 100, the edge of the optical film 200 may not exceed the light guide plate 100 and the rubber frame 300 supports the display panel 500; at the other three edges of the light guide plate 100, each of the three edges of the optical film 200 extends out of the light guide plate 100 and the spacer 400 supports the display panel 500.

It should be noted that is not limited to a solution where all the three edges of the optical film 200 extend out of the light guide plate 100. According to actual needs, one or more edges of the optical film 200 may extend out of the light guide plate and may be supported by the rubber frame 300, and a spacer 400 is arranged at the one or two edges to support the display panel and prevent light leakage.

In an optional embodiment of the present disclosure, as shown in FIG. 1 to FIG. 3, the rubber frame 300 includes four edges. The four edges includes a first edge frame located at the light incoming side of the light guide plate 100 and three edge frames other than the first edge frame. First supporting faces 301 are provided at two ends of each edge frame of the three edge frames of the rubber frame 300, where the first supporting faces 301 are protruding and are used to support the display panel 500. A second supporting face 302 is provided at a center of each of the three edge frames, where the second supporting face 302 is sunk and is used to support the optical film 200. At least a portion of the optical film 200, exceeding an edge of the light guide plate 100, is placed on the second supporting face 302.

The display panel 500 includes a first edge located at the light incoming side of the light guide plate 100 and three edges other than the first edge. The first edge of the display panel 500 is supported by the rubber frame 300. A center of each of the three edges of the display panel 500 is placed on the spacer 400 on a corresponding edge of the three edges of the optical film 200. Two ends of each of the three edges of the display panel 500 are placed on the first supporting faces 301 at two ends of a corresponding edge frame of the three edge frames of the rubber frame 300.

In the above solution, the display panel 500 is supported by a whole edge of the rubber frame 300 at the light incoming side of the light guide plate 100, while the other three edges of display panel 500 each are supported by a three-point structure. That is, for each of the three edges of the display panel other than an edge at the light incoming side of the light guide plate 100, two ends are supported by the rubber frame 300 and a center is supported by one or more spacers 400 on the optical film 200. In this way, the display panel 500 is better supported, fixed and prevented from contraction. By supporting the center of each edge with the spacer 400 on the optical film 200, a distance L between the optical film 200 and the display region of the display panel 500 is increased, which prevents light leakage.

Optionally, as shown in FIG. 2, at each edge of the three edges of the optical film 200, at least two spacers 400 are provided. For example, three spacers 400 are provided. The at least two spacers 400 are spaced from each other by a same distance.

In addition, since the edge of the display panel 500 is supported by the three-point structure, a difference between a brightness at the two ends of the display panel 500 and a brightness at the center of the display panel 500 may be prevented by adjusting a transmittance and a shape of the silicone spacer 400.

Furthermore, in an optional embodiment of the present disclosure, there is a set distance between the second supporting face 302 and the first supporting face 301 in a direction perpendicular to the light outgoing face of the light guide plate 100. The set distance is larger than or equal to a sum of a thickness of the portion of the optical film 200 that is placed on the second supporting face 302 and a thickness of the spacer 400.

In the above solution, since the display panel 500 is supported by the rubber frame 300 and the spacers 400 together, a supporting height of the second supporting faces 302 of the rubber frame 300, the optical film 200 and the spacers 400 for supporting the display panel 500 together is required to be same as a supporting height of the first supporting faces 301 of the rubber frame 300 for supporting the display panel 500. The distance between the first supporting face 301 and the second supporting face 302 in the direction perpendicular to the light outgoing face of the light guide plate 100 is required to be same as a sum of a thickness of the optical film 200 and a thickness of the spacer 400.

In addition, in an embodiment of the present disclosure, each of the three edges of the optical film 200 exceeds a corresponding edge of the light guide plate 100 by 0.5 mm or more than 0.5 mm.

Compared with relevant technology, in the above solution, a distance L between the edge of the optical film 200 and the display region of the display panel 500 is increased by about 0.5 mm, which better preventing light leakage.

In addition, as shown in FIG. 3, a display device is further provided in the present disclosure. The display device includes a backlight module, a display panel 500 and a backboard 600. The backlight module adopts the backlight module according to foregoing embodiments of the present disclosure. An edge of at least one side of the display panel 500 is supported by a spacer 400 on the optical film 200. The backboard 600 supports the backlight module and the display panel 500 and surrounds an exterior of the backlight module and the display panel 500.

In an optional embodiment of the present disclosure, as shown in FIG. 2, the display panel 500 includes a first edge at the light incoming side of the light guide plate 100 and three edges other than the first edge. The first edge of the display panel 500 is supported by the rubber frame 300. Each of the three edges of the display panel 500 is placed on the spacer 400 on a corresponding edge among the three edges of the optical film 200.

In the above solution, at the light incoming side of the light guide plate 100, an edge of the optical film 200 may not exceed the light guide plate 100 and the display panel 500 is supported by the rubber frame 300. At other three edges of the light guide plate 100, three edges of the optical film 200 each exceed the light guide plate 100 and the display panel 500 is supported by spacers 400.

Optionally, as shown in FIG. 1 to FIG. 3, the first edge of the display panel is placed on the first edge frame of the rubber frame 300 and is supported by the first edge frame of the rubber frame 300. Two ends of each edge of the three edges of the display panel 500 other than the first edge are placed on first supporting faces 301 at two ends of a corresponding edge frame of the rubber frame 300 other than the first edge frame, and a center of each edge of the three edges of the display panel 500 other than the first edge is placed on a spacer 400 on a corresponding edge of the three edges of the optical film 200, such that the two ends of each of the three edges of the display panel 500 are supported by the first supporting faces 301 and the center of each of the three edges of the display panel 500 is supported by the spacer 400.

In the above solution, the display panel 500 is supported by a whole edge of the rubber frame 300 at the light incoming side of the light guide plate 100, while the other three edges of display panel 500 each are supported by a three-point structure rather than a whole edge of the rubber frame 300. That is, for each of the three edges of the display panel other than the edge at the light incoming side of the light guide plate 100, two ends are supported by the rubber frame 300 and a center is supported by one or more spacers 400 on the optical film 200. In this way, two ends of each edge of the display panel 500 are still supported by the rubber frame 300 and the display panel 500 is better supported, fixed and prevented from contraction. By supporting the center of each edge with the spacer 400 on the optical film 200, a distance between the optical film 200 and the display region of the display panel 500 is increased, which prevents light leakage.

In the backlight module and the display device provided in the present disclosure, at least one edge of the optical film is extended, such that at least a portion of the at least one edge of the optical film exceed the edge of the light guide plate and is placed on the rubber frame. A spacer is arranged at the at least one edge of the optical film to support the display panel. Compared with a manner that the rubber frame supports the display panel in relevant technology, since the optical film extends out, a distance between the optical film and a display region of the display panel is increased, thereby effectively solving light leakage caused when a bezel of the display panel in the relevant technology is too small (for example, equal to or smaller than 2 mm).

Optional embodiments are described hereinabove. It should be noted that various improvements and replacements can be made by the ordinary skilled in the art without departing from the principle of the present disclosure. The improvements and replacements all fall within the protection scope of the present disclosure.

What is claimed is:
1. A backlight module, comprising:
a light guide plate, including a light incoming side and a light outgoing face;
a rubber frame, arranged at four edges of the light guide plate;
an optical film, arranged on the light outgoing face of the light guide plate and including four edges, wherein at least a portion of at least one edge among the four edges of the optical film exceeds an edge of the light guide plate and is placed on the rubber frame, the rubber frame supports the optical film; and one or more spacers, wherein the one or more spacers are located on the portion of the at least one edge among the four edges of the optical film that is placed on the rubber frame and are located on a surface of the optical film away from the rubber frame, and the one or more spacers are used to support a display panel on the backlight module, wherein the four edges of the optical film comprises a first edge located at the light incoming side of the light guide plate and three edges other than the first edge, and in a direction perpendicular to the light outgoing face, the first edge of the optical film and an edge of the light incoming side of the light guide plate are located in a same plane; and wherein at least a portion of each of the three edges of the optical film exceeds an edge of the light guide plate and is placed on the rubber frame, and a plurality of spacers is arranged at each of the three edges of the optical film, wherein the plurality of spacers is independent from each other and there is a gap between any two immediately adjacent two spacers.

2. The backlight module according to claim 1, wherein the one or more spacers are silicone spacers having a set transmittance.

3. The backlight module according to claim 1, wherein the rubber frame comprises four edge frames and the four edge frames comprises a first edge frame located at the light incoming side of the light guide plate and three edge frames other than the first edge frame; first supporting faces are provided at two ends of each edge frame of the three edge frames of the rubber frame, the first supporting faces being protruding and supporting the display panel; a second supporting face is provided at a center of each of the three edge frames, the second supporting face being sunk and used to support the optical film; and the at least the portion of each of the three edges of the optical film that exceeds the edge of the light guide plate is placed on the second supporting face.

4. The backlight module according to claim 3, wherein at a center of each edge of the three edges of the optical film, the edge of the optical film, an edge of the one or more spacers and an outer edge of the rubber frame are located in a same plane in the direction perpendicular to the light outgoing face of the light guide plate; and wherein at two ends of each edge of the three edges of the optical film, the optical film extends out of the edge of the light guide plate and abuts against an inner edge of the rubber frame.

5. The backlight module according to claim 1, wherein the one or more spacers are spaced from each other by a substantively same distance on a corresponding edge of the three edges of the optical film.

6. The backlight module according to claim 3, wherein there is a set distance between the second supporting face and the first supporting face in the direction perpendicular to the light outgoing face of the light guide plate, and the set distance is larger than or equal to a sum of a thickness of the portion of the optical film that is placed on the second supporting face and a thickness of the one or more spacers.

7. The backlight module according to claim 1, wherein at least two spacers are provided at each of the three edges of the optical film.

8. The backlight module according to claim 1, wherein each of the three edges of the optical film exceeds a corresponding edge of the light guide plate by 0.5 mm or more than 0.5 mm.

9. A display device, comprising:
the backlight module according to claim 1;
a display panel; and
a backboard, supporting the backlight module and the display panel and surrounding an exterior of the backlight module and the display panel;
wherein at least one edge of four edges of the display panel is supported by the one or more spacers on the optical film.

10. The display device according to claim 9, wherein the display device comprises the backlight module according to claim 3, the first edge of the display panel is placed on the first edge frame of the rubber frame and is supported by the first edge frame of the rubber frame, two ends of each edge of the three edges of the display panel are placed on first supporting faces at the two ends of a corresponding edge frame of the rubber frame, and a center of each edge of the three edges of the display panel is placed on the one or more spacers on a corresponding edge of the three edges of the optical film, two ends of each of the three edges of the display panel are supported by the first supporting faces and the center of each of the three edges of the display panel is supported by the one or more spacers.

* * * * *